No. 872,443. PATENTED DEC. 3, 1907.
T. L. McDONALD.
CULTIVATOR.
APPLICATION FILED JUNE 1, 1907.

3 SHEETS—SHEET 1.

No. 872,443.

PATENTED DEC. 3, 1907.

T. L. McDONALD.
CULTIVATOR.
APPLICATION FILED JUNE 1, 1907.

3 SHEETS—SHEET 3.

Witnesses
J. Milton Jester.
D. L. Nash.

Inventor
T. L. McDonald
By Watson E. Coleman
Attorney

UNITED STATES PATENT OFFICE.

THOMAS LEE McDONALD, OF LUELLA, TEXAS.

CULTIVATOR.

No. 872,443.  Specification of Letters Patent.  Patented Dec. 3, 1907.

Application filed June 1, 1907. Serial No. 376,806

*To all whom it may concern:*

Be it known that I, THOMAS LEE McDONALD, a citizen of the United States, residing at Luella, in the county of Grayson and State of Texas, have invented certain new and useful Improvements in Cultivators, of which the following is a specification, reference being had therein to the accompanying drawing.

My invention relates to improvements in agricultural implements for use in cutting weeds, cultivating and the like.

One object of the invention is to provide a simple, strong, durable and comparatively inexpensive implement of this character which may be effectively used for scraping and cutting weeds between rows of corn, cotton or other plants.

Another object of the invention is to provide weed cutting or scraping devices which may be used as attachments upon the wheeled frames of ordinary cultivators and plows.

Figure 1:
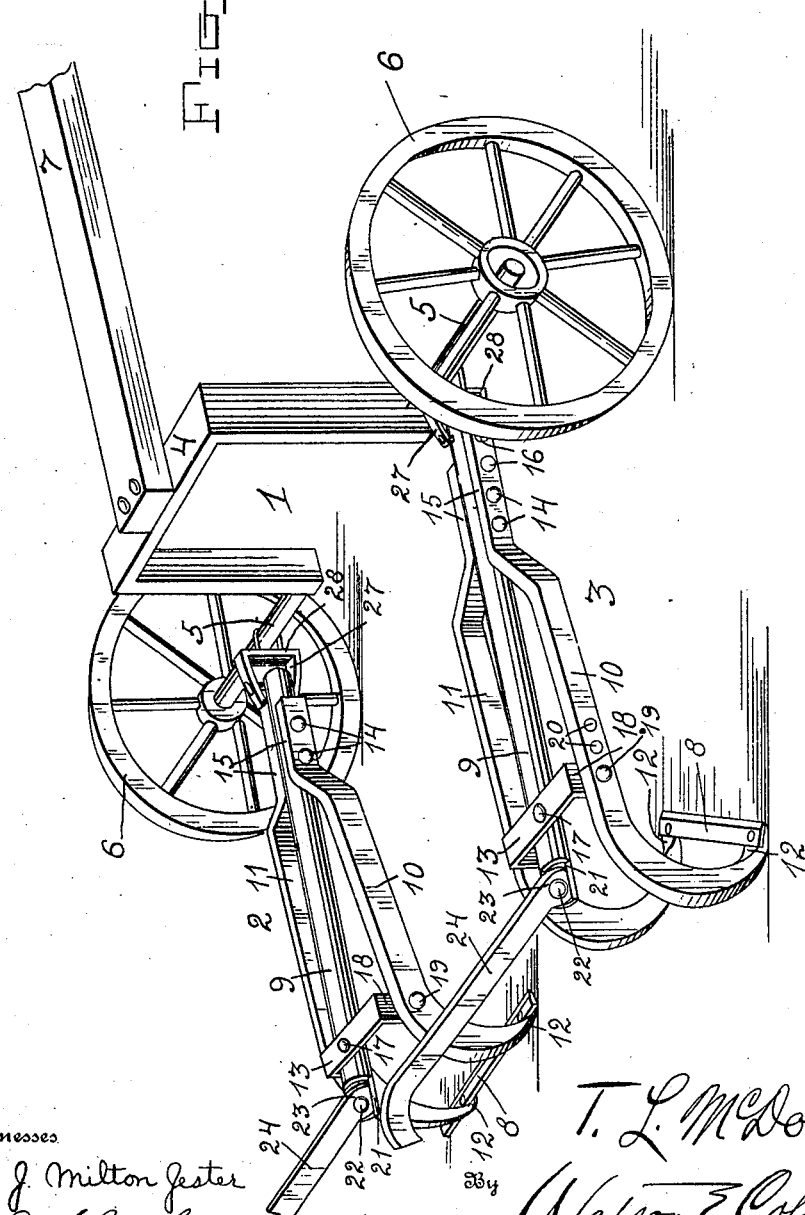
Figure 2:
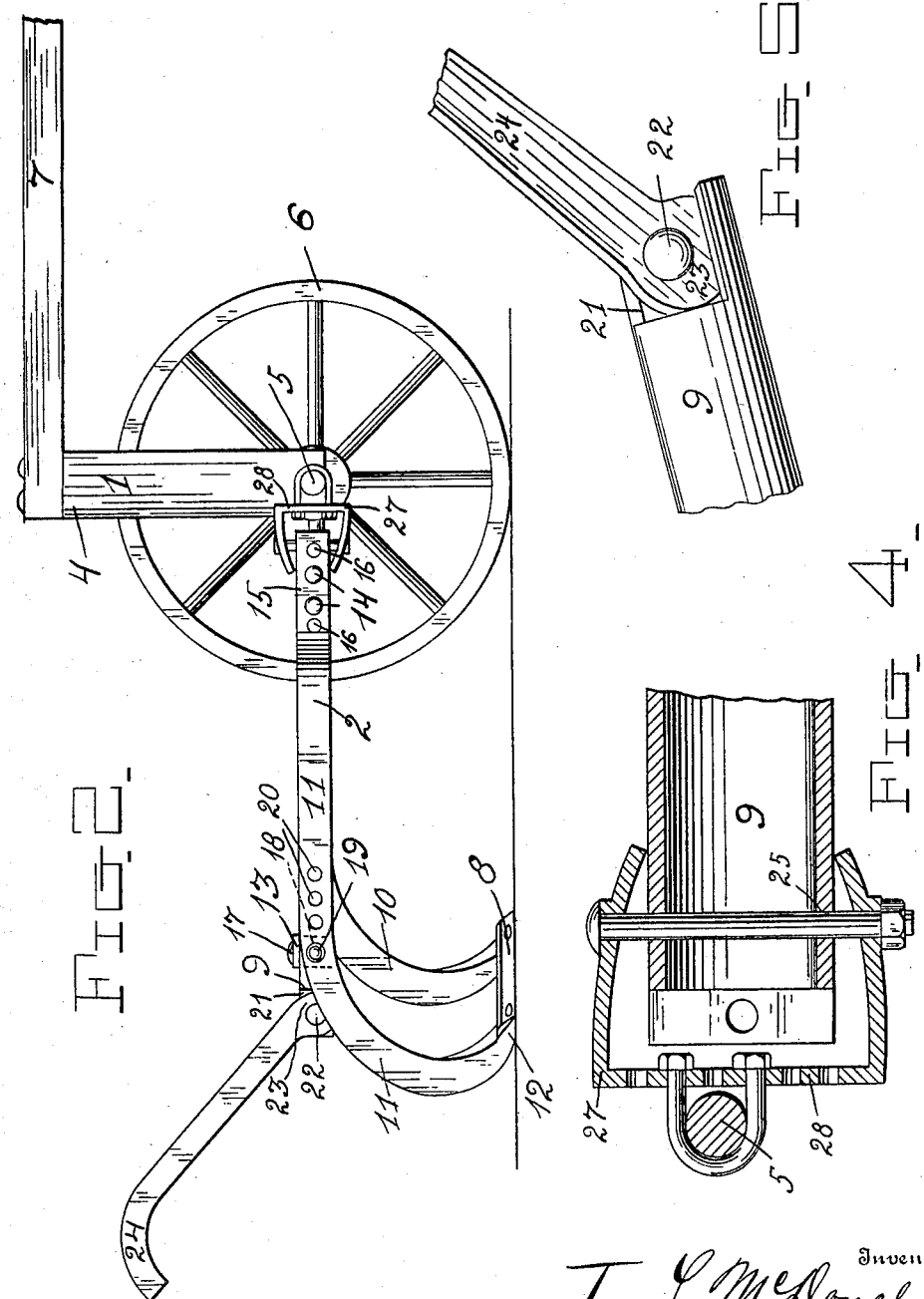
Figure 3:
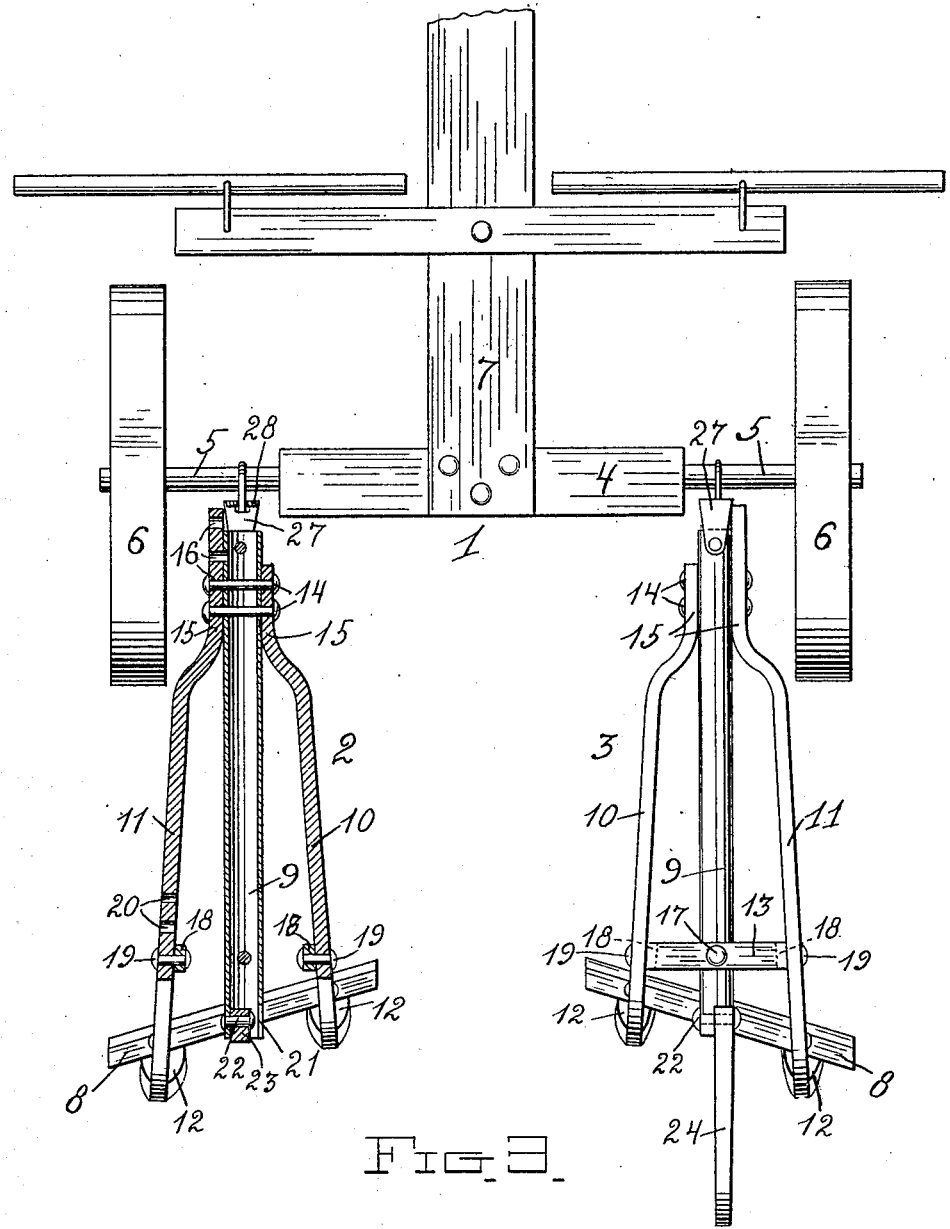

With the above and other objects in view the invention consists in the novel construction, and the combination of parts hereinafter described and claimed, and illustrated in the accompanying drawings, in which Figure 1 is a perspective view of my improved weed cutting cultivator; Fig. 2 is a side elevation with one of the supporting wheels removed; Fig. 3 is a detail horizontal section through one side of the machine; Fig. 4 is a detail vertical section through the clevis and its attached parts; and Fig. 5 is a detail perspective showing the manner in which the handle is secured to the central beam.

My improved weed cutting cultivator comprises a wheel supported frame 1 to which are connected two similar scraper carrying sections or members 2, 3. The frame 1 comprises an arched axle 4 adapted to span a row of plants and having suitably journaled upon its outwardly projecting ends 5 supporting wheels 6. Upon the center of the upper or arched part of the axle is suitably secured a tongue 7 to which the draft animals may be attached.

Each of the sections or members 2, 3 is provided with a substantially horizontal cutting or scraping blade 8 and they are identical in construction, excepting that the blades 8 on the two members are reversely disposed so that they are inclined outwardly and rearwardly from the longitudinal axis of the machine. Each member comprises a central beam 9 in the form of a tube and two side beams 10, 11 in the form of flat bars arranged upon the opposite sides of the central beam. The inner and outer beams 10, 11 have their rear ends curved downwardly and then forwardly to provide feet 12, to the flattened ends of which is riveted or otherwise suitably secured one of the scraper blades 8. The inner beam or foot member 10 is of less length than the outer one 11 so that the blade which connects them is angularly disposed, as will be readily understood upon reference to the drawings.

For the purpose of varying the angle of the blade 8, I preferably make the outer beam 11 longitudinally adjustable and I accomplish this and also securely fasten both of the side beams to the central one, by providing a cross brace 13 and transverse bolts 14. The latter are passed horizontally through transverse alining openings formed in the forward end of the central beam 9 and in the parallel front ends 15 of the side beams 10, 11. This straight portion 15 of the outer beam 11 is of greater length than the corresponding portion on the inner beam and in it are formed a longitudinal series of apertures 16 through any of which the bolts 14 may be passed so that said outer beam 11 may be adjusted longitudinally. The cross brace 13 is in the form of a flat bar secured at its center upon the top of the rear portion of the central beam by a rivet or the like 17 and having its downwardly bent ends 18 secured by bolts or the like 19 upon the inner faces of the beams 10, 11. A series of openings 20 are provided in the outer beam 11 for the reception of the bolt 19 to permit of the longitudinal adjustment of said beam 11. The rear end of the central beam 9 is cut away, as at 21, upon its outer side and in it is secured by a rivet, bolt or the like 22, the enlarged lower end 23 of a handle 24. The front end of the beam 9 is formed with vertically alining apertures 15 to receive a bolt 26 which also passes through the ends or arms of a substantially U-shape clip or clevis 27. The vertical portion 28 of the latter, as shown in Fig. 4, is formed with a vertical series of apertures to receive a U-shape bolt or clip 29 which surrounds one end 5 of the axle. This connection of the front ends of the beam 9 permits the latter to have swinging movement in both vertical and horizontal planes and at the same time the clevis may be adjusted both vertically and horizontally upon the axle.

In use, the implement is drawn forwardly by draft animals so that its arched axle 4 spans a row of plants and its two scrapers or cutters 8 travel upon the surface of the ground or slightly beneath the same. The operator walks in rear of the implement and by manipulating the handles 24 he can cause the scrapers to enter the ground to any depth and also move them laterally or horizontally to cause them to cut weeds, etc. between the plants in the row over which the implement is drawn.

Having thus described my invention what I claim and desire to secure by Letters Patent is:—

An implement of the character described comprising a central beam formed adjacent to its front end with transverse apertures, two substantially parallel side beams arranged upon opposite sides of the central one and having their rear ends bent downwardly to provide feet and their front ends bent inwardly into parallel relation and engaged with the central beam, one of said side beams having apertures in its front end and its rear portion and the other of said side beams having longitudinal series of apertures in its corresponding parts whereby it may be adjusted longitudinally, transverse fastenings passed through the alining apertures in the front end of the central beam and the front end of the side beams, a cross bar arranged upon the rear portion of the central beam and having angularly bent apertured ends, transverse fastenings passed through said ends of the cross bar and the apertures in the rear portions of the side beams, and a scraper blade pivoted at its ends to the feet of the side beams and adapted to be adjusted angularly by adjusting one of said side beams longitudinally with respect to the central beam and the other side beam, substantially as set forth.

In testimony whereof I hereunto affix my signature in presence of two witnesses.

THOMAS LEE McDONALD.

Witnesses:
J. D. HAIZLIP,
RAYMOND LYON.